United States Patent
Hoffmann et al.

(10) Patent No.: US 11,036,112 B2
(45) Date of Patent: Jun. 15, 2021

(54) ELECTRICALLY CONTROLLABLE OPTICAL ELEMENT MADE OF AN OPTICALLY ISOTROPIC LIQUID, IN PARTICULAR LENS, AND METHOD FOR THE PRODUCTION THEREOF ON THE BASIS OF LIQUID COMPOSITES

(71) Applicants: FOCUSTEC GmbH, Stockdorf Gem. Gauting (DE); Stephanie Faustig, Munich (DE); Klaus Hoffmann, Munich (DE)

(72) Inventors: Klaus Hoffmann, Munich (DE); Joachim Stumpe, Nauen (DE); Thomas Fischer, Berlin (DE); Michael Rutloh, Berlin (DE)

(73) Assignee: FOKUS TEC GmbH, Gennany (DE)

( * ) Notice: Subject to any disclaimer, the term of this patent is extended or adjusted under 35 U.S.C. 154(b) by 179 days.

(21) Appl. No.: 15/780,489

(22) PCT Filed: Dec. 2, 2016

(86) PCT No.: PCT/EP2016/025164
§ 371 (c)(1),
(2) Date: May 31, 2018

(87) PCT Pub. No.: WO2017/092877
PCT Pub. Date: Jun. 8, 2017

(65) Prior Publication Data
US 2019/0004391 A1    Jan. 3, 2019

(30) Foreign Application Priority Data
Dec. 2, 2015 (DE) .................... 10 2015 015 436.2

(51) Int. Cl.
*G02F 1/29*    (2006.01)
*C09K 19/34*    (2006.01)
(Continued)

(52) U.S. Cl.
CPC ............... *G02F 1/29* (2013.01); *C09K 19/12* (2013.01); *C09K 19/3455* (2013.01);
(Continued)

(58) Field of Classification Search
CPC combination set(s) only.
See application file for complete search history.

(56) References Cited

U.S. PATENT DOCUMENTS

| 2007/0263152 A1* | 11/2007 | Mazaki | ............ G02F 1/133634 349/130 |
| 2009/0225260 A1* | 9/2009 | Adachi | ............ G02F 1/133707 349/114 |
| 2013/0306908 A1* | 11/2013 | Jansen | ............... C09K 19/3402 252/299.61 |

FOREIGN PATENT DOCUMENTS

WO    2014176717 A1    11/2014

OTHER PUBLICATIONS

Yang Young-Cheol, "Electro-optic Kerr effect in Polymer-stabilized isotropic liquid crystals," Applied Physics Letters, Jan. 13, 2011, p. 23502, vol. 98 No. 2, AIP Publishing LLC, U.S.A.; Cited ISR.
(Continued)

*Primary Examiner* — Anthony J Frost
(74) *Attorney, Agent, or Firm* — Rankin, Hill & Clark (57) ABSTRACT

In order to configure or produce an electrically controllable optical element on the basis of the electro-optic Kerr effect with a low threshold and operating voltage, a minimized temperature dependence of the effect and a low response time, the Kerr liquid according to the invention comprises a mixture of rod-shaped molecules and non-rod-shaped molecules as active composites, a thin layer having a pre-stamping, wide-mesh, anisotropic network between structured and/or planar conductive layer applied to a substrate thus configure a thin-film cell in such a way that without electric field the state of the active composite of the Kerr
(Continued)

liquid in the working temperature region RT is isotropic and that by electrically continuous adjustment, of the voltage U or by a switching-on or switching-off a change the voltage U, in the optical element a voltage-induced phase shift or a refractive index deviation is generated and the light passes through an electrode gap perpendicular to the electrodes.

10 Claims, 3 Drawing Sheets

(51) Int. Cl.
    *G02F 1/07*         (2006.01)
    *C09K 19/12*       (2006.01)
    *C09K 19/30*       (2006.01)
    *G02F 1/061*      (2006.01)
    *G02F 1/133*      (2006.01)

(52) U.S. Cl.
    CPC ............ *C09K 19/3458* (2013.01); *G02F 1/07* (2013.01); *C09K 2019/122* (2013.01); *C09K 2019/301* (2013.01); *G02F 1/061* (2013.01); *G02F 1/076* (2013.01); *G02F 1/13306* (2013.01); *G02F 1/291* (2021.01); *G02F 2202/022* (2013.01)

(56) References Cited

OTHER PUBLICATIONS

Zhu Ji-Liang, "Improved Kerr constant and response time of polymer-stabilized blue phase liquid crystal with a reactive diluent," Applied Physics Letters, Feb. 13, 2013, p. 71104, vol. 102 No. 7, AIP Publishing LLC, U.S.A.; Cited ISR.

International Search Report dated Apr. 4, 2017 filed in PCT/EP2016/025164.

\* cited by examiner

ELECTRICALLY CONTROLLABLE OPTICAL ELEMENT MADE OF AN OPTICALLY ISOTROPIC LIQUID, IN PARTICULAR LENS, AND METHOD FOR THE PRODUCTION THEREOF ON THE BASIS OF LIQUID COMPOSITES

BACKGROUND OF INVENTION

Field of Invention

The invention relates to an electrically controllable optical element, in particular a lens, made of an optically isotropic liquid and a process for its production based on liquid composites.

Brief Description of Related Art

Adjustable optical elements are currently predominantly mechanical systems. Mechanical systems are heavy and bulky and prone to failure due to the use of mechanical drives and often too slow. Non-mechanical optical elements are therefore advantageous and the subject of current development. While solutions have already been commercialized for such optical elements with a smaller usable diameter, this is not the case with larger apertures.

The electro-optical Kerr effect (J. Kerr 1875), quadratic electro-optic effect or electrical birefringence is the appearance of a quadratic increase in the optical birefringence according to the applied electric field strength of an electric field. In this effect, the molecules in the electric field are directed to permanent dipole moment in an isotropic liquid. As a result of this alignment, the material in the field becomes optically anisotropic, with a higher refractive index in the field direction and, perpendicularly, a lower refractive index compared to the isotropic liquid in the de-energized state. In a Kerr cell, the refractive and polarizing behavior of a material is changed by an external electric field, so that electrical signals can be converted into optical signals. Transverse to the direction of the transmitted light by electrode plates in the Kerr fluid is applied an electric field. The Kerr fluid used is usually pure nitrobenzene, which has a Kerr constant K of $2.44 \times 10^{-12}$ M/V$^2$, is liquid at room temperature and can be readily mixed with alcohols, ethers and benzene. By comparison, nitrotoluene has a Kerr constant K of $1.37 \times 10^{-12}$ m/V$^2$ and water has a Kerr constant K of $5.1 \times 10^{-12}$ m/V$^2$. In the case of the liquid mentioned and the usual cell sizes in the centimeter range, electrical voltages in the range of a few kilovolts are required. The front and back of the Kerr cell are translucent glass, and the metal side walls are electrode plates.

The technical application of a Kerr cell is mainly a condenser with the Kerr liquid—mostly nitrobenzene—as a dielectric. It is placed between crossed polarizers whose main optical axes are inclined at 45° to the direction of the electric field. If there is no voltage applied to the cell, the light cannot penetrate this arrangement.

Applying the electric field now the Kerr liquid is twice breaking, i.e. the light component oscillating in the direction of the field receives another propagation rate as that oscillating perpendicular to the field. Between the two at the exit from the Kerr cell is thus a phase shift δ present. Due to the optical arrangement now the amount of light L, which depends on δ and the amount of light $L_0$, which occurs in the best case, is according to the following relationship:

$$L = L_0 \cdot \sin^2 \delta/2$$

The phase shift δ is dependent on the field strength E, the length l of the light path between the capacitor plates and the Kerr constant of the dielectric B according to the relationship $$\delta = 2\pi \cdot B \cdot l \cdot E^2$$

Thus, amount of light L is $$L = L_0 \cdot \sin^2(\pi \cdot B \cdot l \cdot E^2)$$

In order to substantially increase the sensitivity of the Kerr cell as a light relay, it is known from DE 555 249-A, to additionally add to the phase shift of the partial beams of the polarized light generated in the Kerr cell by applying voltage yet another unchangeable phase shift. To generate the additional phase shift, a double-breaking crystal plate is switched into the light path.

For liquids—such as nitrobenzene—the refractive index difference found is very low even when voltages in the kilovolt range are applied. Due to the small extent of the long-known Kerr effect, the production of active optical elements based on it seems initially excluded. Thus, the Kerr constant, which quantifies the strength of the Kerr effect, for nitrobenzene (Zinth, W., Optics, Oldenbourg-Verlag, Munich, 2011) is only about $2.44 \times 10^{-12}$ M/V$^2$.

For many decades, attempts were made repeatedly to find liquids that have a higher Kerr constant than the previously used nitrobenzene and thereby the same effect at lower control voltage results. For example, from DE 622 368-A a Kerr cell fluid is known where double or triple substitute of a benzene ring, which are in solid state at room temperature, are brought into a solvent whose Kerr constant is of the order of the nitrobenzene. Suitably, the substituent $NO_2$ is preferred. The solvents used according to DE 622 368-A are, for example:

nitrobenzene
nitrotoluene meta
nitrotoluene ortho

As substances to be dissolved are proposed: dinitrobenzene ortho, nitraniline (preferably para), nitrotoluene para, Chlornitrobenzol ortho, Chlordinitrobenzen 1:2:3, Dichlornitrobenzen 1:2:3, nitronaphthalene alpha, dinitronaphthalene 1:8.

Furthermore, elements based on macroscopically oriented liquid crystalline materials are currently used. However, these systems have the disadvantage that they act only on one polarization direction of the light, while leaving light with the polarization direction perpendicular thereto virtually uninfluenced. Due to this fact, either absorptive polarizers are combined with such elements. However, this necessarily leads to a reduction in the amount of light to less than 50%. To overcome this disadvantage, it has been proposed to combine two (or more) identical elements of orthogonal orientation with each other, which leads to a significantly higher effort and additional sources of error due to spatial crosstalk, causing optical losses and additional problems with the exact alignment of the elements to each other.

Further isotropic LC states are scattering PDLC, low-scattering nano-PDLC systems and isotropic polymer-enhanced isotropic blue LC phases. These are characterized by high switching voltages caused by the polymer matrix and domain boundaries. In contrast to reflective elements, such as LC phase modulators, transmissive elements interfere with the occurring of rest scattering.

For isotropic liquids with high anisotropy of the dipole moment and rod-shaped molecular shape, significantly larger refractive index differences can be achieved, so that order of magnitude higher Kerr constants are found. This was for example for isotropic phases of liquid crystals already shown at higher temperatures.

Significantly higher values can be obtained in isotropic melts of liquid crystals (J. Chem. Soc., Faraday Trans. 2, 1976, 72, 1447-1458/DOI: 10.1039/F29767201447) just above the clearing temperature or in polymer-stabilized isotropic liquid crystals (Appl. Phys. Lett. 98, 023502 (2011)/DOI: 10.1063/1.3533396) and polymer-stabilized blue phases of liquid crystals. Here Kerr constants of up to $300 \times 10^{-12}$ $mV^{-2}$ were measured. However, a major disadvantage of the Kerr effect in such systems is the very strong temperature dependence of the effect, as described for example for the isotropic melt of the liquid crystal 5CB (Dunmur D. A. and Tomes A. E., 1981, Mol. Cryst. Liq. Cryst. 76, 231). In polymer-stabilized isotropic liquid crystals, the temperature dependence could be reduced, but only for a very limited temperature range (J. Phys. D: Appl. Phys. 42 (2009) 112002/DOI: 10.1088/0022-3727/42/11/112002). In the majority of these systems, the required high voltage and long switching times prove unfavorable.

In the field of optical communication or communications to generate advanced electro-optical elements in combination with planar waveguides or optical fibers which are suitable for applications requiring modulation, attenuation, polarization control and switching of optical signals, WO 2004/046796-A1 discloses a waveguide device which comprises an optical waveguide core and a plating which is optically coupled to the optical waveguide core. The cladding comprises an optically functional zone with a Kerr effect medium defining a refractive index that is designed to be responsive to a refractive index that varies to a control signal, which is applied to the optically functional zone. The refractive index of the optically functional zone is lower than that refractive index of the optical waveguide core at the optical wavelength and the temperature according to the operation of the device. The plating comprises an optically functional zone defined by an unpolarized substantially isotropic or substantially anisotropic polymeric plating medium. In particular, the plating medium is a polymeric/chromophore lining characterized by chromophoric mobility sufficient to enable the optically functional zone to undergo a passive transition from a substantially oriented state to a substantially isotropic state in less than about one second. Specifically, the polymeric/chromophoric lining contains at least about 5 weight percent and about 20 weight percent chromophore and is plasticized and the Kerr effect medium contains a polymer selected from polycarbonate, terpolymer, PMMA and polycyclohexane. Preferably, the chromophore has a donor component, a bridging component having a conjugated and/or aromatic component, and an acceptor component. In detail, 12 different structural formulas of the Kerr effect medium are given. Furthermore, a controller is provided which is configured to control or regulate the operating temperature of the waveguide device. The polymeric plating medium or lining medium is characterized by an effective glass transition temperature which is lower than the operating temperature of the device. It should be noted that the effective glass transition temperature of a material is the temperature at which the reorientation mobility of the chromophore is a relatively large increase in function of the temperature of the material shows. The effective glass transition temperature of an electro-optic material may be determined by measurements of the electro-optic response of the material as a function of its temperature. The plating medium has an acceptable level of chromophoric mobility and physical stability by either a plasticizing agent in the plating medium or by ensuring that the effective glass transition temperature of the plating medium is lower than the operating temperature of the plating medium device. In detail, the plating media of WO 2004/046796 are characterized by effective glass transition temperatures below about 120° C. down to 20° C. In order to achieve sufficient chromophore mobility, a solvent is provided in the plating medium. In a case of a polymeric plating medium containing a chromophore and a base polymer, suitable solvents dissolve both the chromophore and the polymer. In many cases, the use of such solvent leads at appropriate operating temperatures of the devices at or near room temperature. By means of control electrodes, an electric field E is generated in the optically functional zone of the plating. Alternatively, the control signal may cause a thermal signal, wherein the optically functional region of the plating is responsive to the magnitude of the thermal signal. In each case, the waveguide device has a suitable controller configured to change independently the optical properties of optically functional sections of the optically functional zone. In particular, the application of a control voltage to an electro-optic polymer plating or coating also induces successive phase shifts $\Delta\varphi$ in the optical signal, but successive phase shifts of equal value are induced with progressively smaller increases in the optical signal control voltage V (E approximately $\sin^2 \varphi$, where $\varphi = BV^2$). Therefore, in the case of the successive phase shifts $\Delta\varphi$ of 180°, the magnitude of the successive control voltage increments $V_\pi$ which is required for indexing successive phase shifts of 180°, decreases with the magnitude of the control voltage V. To operate a Mach-Zehnder interferometer (i.e. a beam splitter having two arms for measuring phase shifts or for modulating light through targeted phase modulation in one arm of the interferometers or for a wavelength-dependent demultiplexing) over a 180° phase shift, about 340 volts are required in the waveguide device of WO 2004/046796-A1. The next 180° phase shift at about 520 volts, however, is achieved by merely increasing the driver voltage by about 180 volts (the difference between 520 volts and 340 volts). A third 180° phase shift occurs at about 610 volts, an increase of only about 90 volts. A simple extrapolation leads to the suggestion that with a bias of about 3000 volts, a $V_\pi$-drive voltage of about 4 volts can be achieved. Improvements in the polymeric plating medium or coating medium and refinement of the electrode configuration used as control electrodes can achieve an 180° phase shift with drive voltages of less than 5 volts with a bias voltage of about 1000 volts.

Another technical application of the electro-optical Kerr or Pockels effect in the field of optical communication or communications are grids with electrically adjustable refractive index and electrically adjustable spatial periodicity as input/output coupler, waveguide coupling element (interface), mode/polarization converter, mode/polarization filter, deflector, reflectors. For this purpose, EP 1 155 355 B1 discloses a diffraction grid with an electrically adjustable refractive index and an electrically adjustable spatial frequency, wherein the grid comprises:

A substrate;

An electro-optic structure extending over the substrate, wherein the electro-optic structure comprising a waveguide having a propagation axis;

A first and a second electrode structure for generating an electric field in between, wherein the electric field induces diffraction gratings in the waveguide, wherein the first and second electrode structures are arranged on opposite sides of the electro-optical structure and each extends in a plane parallel to the propagation axis of the waveguide, wherein the first electrode structure comprise a first and a second set of arranged fingers, wherein a potential $V_0$ is applied to the first set of fingers and a potential $V_0 + ¢\ V$ is applied to the second set of fingers, wherein $V_0$ is variable for adjusting the refractive index of the diffraction grid and is variable for switching the spatial periodicity of the grid between discrete values.

Alternatively, to vary externally incident light thereon, the diffraction grid comprises:

A substrate;

An electro-optic structure extending over the substrate;

A first and a second electrode structure for generating an electric field in between, wherein the electric field induces diffraction grids in the electro-optical structure, wherein the first and second electrode structure extend along superimposed planes parallel to each other and to the electro-optical structure and are arranged on opposite sides of the electro-optical structure, wherein the first electrode structure comprises a first and a second set of fingered fingers, the first set of fingers being at a potential $V_0$ and the second set of fingers being at a potential $V_0 + ¢\ V$, where $V_0$ is variable for adjusting the refractive index of the diffraction grid and is variable for switching the spatial periodicity of the grid between discrete values.

Specifically, the diffraction grid of EP 1 155 355 B1 may be designed to act as a Bragg filter or the grid may be used as collinear reverse coupling for a reflector function, serving as an active optical filter for distributed feedback (DFB) or distributed Bragg reflection (DBR) lasers. Other embodiments relate to applications in multiplexing systems for wavelength division (WDM, wavelength division multiplexing) for fiber optic communication. The grid may be used alone or in combination with other electro-optical components to form integrated structures. The grid comprises an electro-optical structure, for example an electro-optical rod formed of a material such as $LiNbO_3$ or an electro-optical polymer, preferably having a thickness of approximately 0.5 to 2 μm and a width of approximately 5 μm, which extends over a substrate. First and second electrode structures are provided on opposite sides of the electro-optical structure parallel to the propagation direction. The first and second electrode structures, in particular comb-like shape, are subjected to different potentials between an electric field and thus generating the periodicity due to the resulting electric field. Modern manufacturing technologies in the nanoscale allowed producing fingered electrode structures with sub-micron finger distances. The fingered electrodes are made of a transparent conductive material and indium tin oxide (ITO) with for example, a width a=105 μm and ITO thickness of μm. The spacings between the waveguide and the electrode fingers are filled with buffer layers of a dielectric material, such as $SiO_2$, which has a refractive index lower than the refractive index of the waveguide. These buffer layers form the cladding layer of one within the formed waveguide electro-optical rod and protect the guided wave from the lossy interactions with the electrodes.

Furthermore, the use of the electro-optical Kerr effect in connection with prismatic spectacle lenses of polarizing spectacles is known from DE 28 28 910 A1 in the technical field of stereophonic television. A polarizing device is arranged and dimensioned so that it extends over the entire surface of the screen of a television, wherein the polarization plane is rotatable for selectively aligning with the polarization plane of the left lens or the right lens of the polarizing glasses of the viewer. The rotation of the plane of polarization of the polarizing device is preferably achieved by a Kerr effect cell consisting of an optically active material which rotates the polarization plane of the continuous polarized light in response to a voltage applied to opposite electrodes of the cell from a control voltage source voltage. It is possible to reverse the role of the left or right lens, wherein in one state of the polarizing device, the left lens transmit the light passing through the polarization device while the right lens acts as a dark filter, and in the other state of the device, the lenses blocks or transmit the light passing through the polarization device. Further, at the option of the viewer, the left lens or the right lens may be selected to function as a dark filter, so that it is possible to make the image appear closer or farer to the viewer as desired. The control voltage source may provide said voltage in response to a command signal that may be supplied along with a television signal (in the case of television signal reproduction) or in response to a signal recorded on a film (in the case of movie playback). The Kerr effect cell can be made of PLZT (polycrystalline lanthanum-modified lead zirconate titanate) or of other known ferroelectric ceramic materials.

Another application for polarization-free, electrically adjustable or switchable optical lenses is visual aids and switchable magnification systems (telescope glasses). Classical vision aids, including bifocal systems, are increasingly being equipped with additional features. A very important aspect is the development of active, i.e. more intelligent or switchable or adjustable optical systems. Currently, this development is also influenced by the development of "Head Mounted Displays (HMD) and LC systems for the rapidly evolving field of augmented reality" (AR is a technology that combines real-world images with computer-generated information so that images of the real world are supplemented with virtual information). This development is based on LCD-based micro displays. In modified form, this technology can also revolutionize other areas of optics and lead to the replacement of classic refractive elements such as lenses, prisms and other passive elements. From the two aspects of customizable or adjustable lenses and extended functionality, for example, EP 1 463 970 B1 discloses a binocular electronic spectacle with a spectacle frame whose frame is designed as a dust-tight closed housing to which the straps are hinged and which comprises at least an electronic video camera disposed in the housing, a lens whose lenses are facing forward, and a CCD sensor. Specifically, a motorized adjustable, front arranged lens system with lenses made of plastic and provided with guide means for adjustment by bending and/or rotation of the individual lenses, which is in communication with the electronic camera. The lens system and the camera are connected to an electrical control device and connected with this is a memory which stores the manual presetting values for both eyes as setpoints for adjustment of the automatic correction of defective vision and eye distance during operation. The correction of vision defects is done by adjusting the refractive power of the lenses and/or focusing including automatic adjustment to read or working distance, wherein a contrast-controlled focusing is made by the controller and is designed so that a permanent contrast-controlled focusing is set. The lens system consists of four lenses and the magnification range is between 2.5 times and 10 times. The control device is used to control the engine and to increase the setting speed a gear is arranged on the output side of the engine. For power supply, an accumulator is arranged in the spectacle frame and at the spectacle frame an indication of the state of charge of accumulator is provided. Furthermore, an interface connected to the camera interface circuit for the connection of recording means is provided. Furthermore, a radio receiver and/or a pager are arranged in the region of the bracket, which are connected to the display. Before the spectacle system is used for the first time, the spectacle wearer adjusts the eye distance and, in case of ametropia, his diopter values. The configurations are stored in the system and serve as the basis for all further, now automatically controlled processes. It takes only seconds to focus on zooming between the reading distance of about 25 cm and the focus to infinity. The mechanical lens system is capable of infinitely zooming objects 2.4 times. The objects are automatically focused—regardless of the level of zoom that can be set at the touch of a button (in analogy to the digital camera). These autofocus spectacle work with a mechatronic interaction of chip-controlled camera, motor, and special surface treated lenses. Other additional features include a memory button, microphone, voice control, speaker in the bracket, external battery packs, memory for long-term recording of video and audio and a spotlight.

An important optical function of such a multifunction spectacles is the magnification system. Conventional telescopic glasses use lens system for enlarging objects viewed in the lower part of the glasses. Characteristic of these telescope spectacles is the fixed magnification system that allows to use only a rather limited area of the entire field of view. Depending on the requirements, a Kepler or a Galilean system is generally used in magnification systems: Galilei systems directly allow the realization of an upright and right-angled magnification, whereas Kepler's systems are characterized by larger fields of view. The Kepler telescope, however, produces a mirror-inverted image that is possibly converted by additional optical elements (prism or lens). If the depth of the magnification system is critical, the Galileo telescope is preferable.

The previously used principles for the development of adjustable optical elements, in particular of lenses, are based on elastic membranes in combination with suitable fluids, the electrowetting principle of liquid lenses or on the electrically induced reorientation of liquid crystals. In elastomeric membranes, a liquid is pumped into a cavern formed by a thin elastomeric film or released into a reservoir to effect a change in the curvature of the membrane. Membrane lenses can also be integrated into microscope systems (see Biomed. Opt. Express 5(2), 645-652 (2014) or Biomed. Opt. Express 5(6), 1877-1885 (2014)). However, this mechanical solution has only moderate switching times, since the membrane cavern must be filled or emptied during the switching process with liquid. In addition, the stability of the elastomeric membrane is to be tested with a high number of switching cycles. In addition, the peripheral of the membrane lenses is relatively bulky by reservoir, pumps and motors.

On the basis of membrane lenses also adjustable vision aids were brought to the market, in which the pumping process is carried out manually. Such systems are naturally very slow.

An alternative to the membrane lenses are liquid lenses based on the principle of electrowetting. Fields of application of these controllable optical autofocus liquid lenses are smartphones, webcams and other applications.

The range of tunable refractive power of the lenses is quite large, ranging from −12 to 12 diopters, the switching times of 20 ms are fast enough for a range of applications, but not sufficient for high clock speeds in the machine vision area. However, for optical vision focusing applications in the machine vision field, there are other requirements for aperture, speed, and resolution. The state of the art for focusing in the industrial sector is the mechanical focusing of the objectives. This pushes to its limits because of the masses to be moved (speed) and in terms of the long-term stability (wear of mechanical elements). A disadvantage of this solution is also that the de-energized state is not optically neutral, but represents a diverging lens. In addition, the free aperture is limited in relation to the overall diameter of the lens element, so that the annular supply unit dominates the lens element, in particular in applications on the head.

Both elements based on the electro-wetting principle and membrane lenses are therefore unsuitable for hybrid optics and also for vision aids or telescope spectacles due to their design with voluminous supply devices and their weight.

Switchable lenses based on liquid crystals (LC—Liquid Crystal) do not show these disadvantages. A switchable bifocals based on liquid crystal is usually based on the field-induced change in the orientation of a thin liquid crystal layer within a classical refractive lens. Due to the refractive index contrast in the switched state an additional lens element is activated to allow a sharp near vision. When switched off, this lens element is not active and the sharp distance vision is ensured by the refractive lens. The switching between the states can be done manually or by a tilt detector.

For applications in webcams or cameras in mobile phones lenses of only a few millimeters in diameter be enough, what greatly simplifies the technical problem. Restrictions here are the strong polarization dependence of the effect used, which either reduced the luminous efficiency by the use of additional polarizers or the structure of the elements is significantly more complex by the alternative orthogonal combination of two elements and has additional sources of error in the production. The advantage of LC-based lenses is that with their help for example telescope systems or focusing devices can be realized that get along completely without mechanical elements and thus enable a robust and maintenance-free optics and also lead to a reduction in depth and weight. In the case of refractive lenses, the possible refractive power is generally determined by the radius of curvature of the phase boundary between optically denser and thinner medium and the refractive index stroke. The same applies to GRIN lenses (gradient index), as such, planar liquid crystal lenses should also be considered. Here the radial refractive index stroke, from the center to edge area, in conjunction with the diameter the determining sizes are the defining factor. The following applies to all these lens types: The required diameter of the lens limits the refractive power to be achieved if the layer thickness of the medium is to remain constant. If the diameter of the lens is to be increased at a certain refractive power, the layer thickness must also be increased. This, however, leads by liquid crystal lenses to a square increase in the necessary switching voltages with a simultaneous decrease in the switching speed.

These limitations can only be overcome by diffraction lenses or, more precisely, phase zone plates. In contrast to Fresnel zone plates based on amplitude modulation, phase zone plates use a phase shift of half the wavelength to achieve the lens function. Therefore, the light output is also significantly higher for them, since the entire incident light is used, instead of only half as in the case of the amplitude zone plates. In addition, the execution as a Gabor hologram (sinusoidal rather than binary transition of the zones) can reduce the typical periodicity of the focal length to a certain focal length.

Conventional rigid optical elements of inorganic materials, such as glass lenses or crystalline beam splitters, are increasingly being replaced by organic materials. Although the former have the advantage of excellent optical properties and high stability they are bulky and characterized by a complex manufacturing technology. Organic materials are much easier to process and, in particular, to structure (injection molding, printing, nanoimprinting, 3D printing, laser structuring). Another key advantage is that many organic materials react to external stimuli such as light, electrical voltage, temperature, etc., thereby permanently or reversibly changing their physical properties. The voltage-induced reorientation of liquid crystals in LCDs is the most prominent example of the use of electrically switchable and adjustable optical elements based on electro-optical orientation effects of liquid crystals. Voltage-induced thickness or length changes of elastomers, usable in actuators or tunable grids, are another example. This makes possible active optical systems or intelligent systems that are specifically adjustable or actively react to external conditions.

The problem of polarization dependence, on the other hand, could be overcome by specific LC systems, which are macroscopically isotropic in the transmission direction. This is true for example for polymer dispersed liquid crystal (PDLC) systems or polymer-stabilized liquid crystals with blue phases (isotropic LC phase with complex 3D structure). Due to increased interactions with the polymer walls, however, high switching voltages are required. In addition, caused by the phase separation, an increased scattering of the transmitted light arises, which significantly limits the suitability of these basic solutions for imaging optical systems. Intensive work is also being done on concepts for reducing the switching times, although these are currently limited in the prior art to a significant switching stroke in the sub-ms range.

The voltage-induced orientation of polar molecules in liquids has long been known as the optical Kerr effect. The Kerr constants of conventional liquids such for example nitrobenzene or carbon disulfide, however, are orders of magnitude too low for use in lenses and the switching voltage by orders of magnitude too high. Significantly higher Kerr constants are observed in isotropic liquid crystals. The switching times are in the single-digit ms range or below. Some of these problems of liquid crystalline systems and conventional Kerr liquids can be overcome by liquid crystals in their isotropic phase above the clearing point. In doing so, preorientation effects of liquid crystals exploited in isotropic melts shortly above the clearing point are used. This leads to polarization-free, fast-switching and sufficiently efficient Kerr systems. A very significant disadvantage, however, is the extremely strong temperature dependence of the effect. In summary, all variants based on the electrowetting principle, the LC orientation or the membrane fluidity have sometimes considerable restrictions in the optical or geometric parameters.

As the above assessment of the prior art shows differently configured devices using the electro-optical Kerr effect, in particular for the modulation of the light known. For a wide industrial application, the very strong temperature dependence of the effect in connection with high operating voltages is disadvantageous.

BRIEF SUMMARY OF THE INVENTION

The invention has for its object to design or manufacture an electrically controllable optical element such that based on the electro-optical Kerr effect, a low threshold and operating voltage, a minimized temperature dependence of the effect and a low response time is achieved.

This object is achieved in an electrically controllable optical element, characterized in that the Kerr liquid is a mixture of rod-shaped molecules and non-rod-shaped molecules as active composites, and in that the Kerr liquid as a thin layer having a wide-mesh, anisotropic network between structured and/or planar conductive layer applied to a substrate thus configure a thin-film cell in such a way that according to the electro-optical Kerr effect, without electric field the state of the active composite of the Kerr liquid in the working temperature region RT is isotropic and that by electrically continuous adjustment of the voltage U or by a switching the voltage U on or switching off a change in the voltage-induced phase shift or in the refractive index deviation of the optical element is generated and the light passes through an electrode gap perpendicular to the electrodes.

Furthermore, this object is achieved in a method for producing an electrically controllable optical element, comprising:
a) the Kerr liquid is a mixture of rod-shaped and non-rod-shaped molecules as active composites, reactive mesogens, photoinitiators and aliphatic monomers,
b) the Kerr liquid is filled in a cell Kerr cell thus configure a thin-film cell,
c) the Kerr liquid is cooled to a lower temperature T than room temperature RT, at which an LC phase forms with a homeotropic orientation,
d) radicals are generated by UV irradiation of the homeotropically oriented layers, effecting polymerization of the oriented reactive semi-mesogens, such that a wide-meshed, loose anisotropic network of mesogens cross-linked with the aliphatic monomers in the Kerr liquid results, such that without voltage U in the working temperature range RT, the composite of rod-shaped molecules with large dipole moment and non-stick, dipolar molecules are again isotropic and when the voltage U is applied, the molecules of the composite are oriented in the direction of the E-field lines.

In the present invention, the electro-optical Kerr effect (see also the Internet Dictionary Wikipedia, https://de.wikipedia.org/wiki/Kerr-Effekt) is used in isotropic liquids. Accordingly, it is not about liquid crystalline states. In particular, in the optical element of the invention, enhancement of the optical Kerr effect is achieved by self-assembly based on a prestamping, wide-meshed, loose anisotropic network. Thus, in a surprising manner by the use of the composites of the invention and the inventive manufacturing technology leading to specific cell configurations in the thin-film cell according to the invention disadvantages can be corrected. The state of the active composites according to the invention is isotropic without electric field in operating temperature range. There are no domains or microdomains of ordered molecules that could lead to scattering. In particular, fixed mesogen clusters are produced which are also part of a precursor mixture (i.e., as starting materials for further synthesis step). They increase the Kerr effect and minimize the temperature dependence of the effect. The entire composite remains in the liquid, isotropic state.

The optical thin-film elements according to the invention based thereon are electrically continuously adjustable or, alternatively, switchable phase modulators, lenses and visual aids between defined states. They are characterized in that they are optically isotropic, i.e. that they are polarization-free and non-scattering. They are realized with electro-optically active composites, which can be applied polarization-free in the transmission direction and are characterized by a high electrically inducible phase shift and/or refractive index stroke. In particular for the use case of visual aids, the operating voltage range of the DC voltage U is between 15 V and 40 V, preferably between 25 V and 30 V.

By means of the method according to the invention, polarization-free, electrically switchable optical elements based on thin-film cells with novel electro-active liquids are prepared whose orientation is determined and is reinforced by the interaction of polar, rod-shaped molecules in anisotropic polymer networks. Molecular design and enhancement of the Kerr effect due to self-assembly become significantly higher refractive index modulations or phase strokes achieved with short switching times and low voltage. Examples of electrically switchable or adjustable lenses, in particular for vision aids, are:
 a) Electrically switchable individual optical elements for visual aids.
 b) Tunable, individually adjustable visual aids.
 c) Switchable magnification system for telescope spectacles.

In a further development of the invention, the thin-film cell has two glass or polymer substrates, the inner surface of each having a conductive ITO electrode as a conductive layer and applied on this with an orientation layer and that a pre-stamping for a wide-meshed, anisotropic polymer network takes place by means of admixed photoinitiators, aliphatic monomers and reactive mesogens in the cooled Kerr liquid, aligning the rod-shaped molecules by applying a voltage U and UV irradiation of the Kerr liquid.

This development of the invention has the advantage that in a surprising manner approximately half of the molecular skeleton can be made mesogenic and is characterized by pronounced interactions with the semi-mesogens of the composite and approximately the other half of the molecular skeleton is non-mesogenic, whereas the deviation from the rod-shaped structure does not decrease the strength of the dielectric anisotropy.

In a preferred embodiment of the invention the orientation layer contains photocrosslinkable or photopolymerizable groups these leading to a homeotropic orientation and that the anisotropic network is covalently fixed to the two substrate interfaces, whereby the network is maintained in its anisotropic form even in the isotropization of Kerr liquid by increasing the temperature in the working range of approximately room temperature RT.

This embodiment of the invention has the advantage that in a surprising manner the effect of the aligning layers enhances a homeotropic orientation (i.e., the molecules align perpendicular to the substrates) and the network in the thin-film cell is fixed to the two substrate interfaces.

BRIEF DESCRIPTION OF THE DRAWINGS

Further advantages and details can be taken from the following description of a preferred embodiment of the invention with reference to the drawing. In the drawing shows.

DETAILED DESCRIPTION OF THE INVENTION

Figure 1:
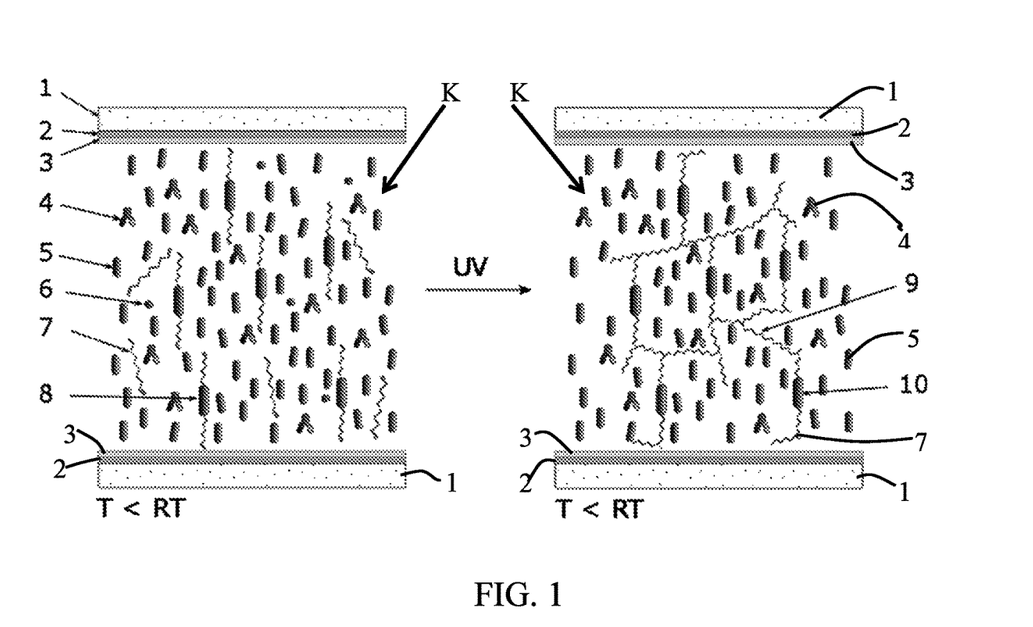
FIG. 1 shows a preferred embodiment of the electrically controllable optical elements, left in the initial state, right after pre-stamping.
Figure 2:
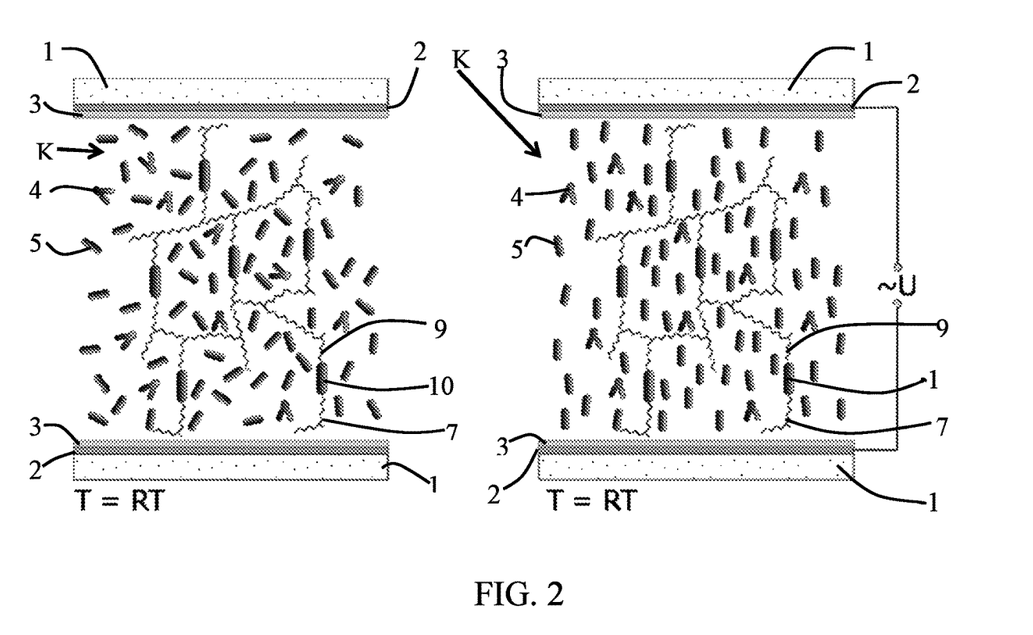
FIG. 2 shows the optical element according to FIG. 1 at approximate room temperature RT, left without application of voltage U and right after application of voltage U, FIG. 3 the composition of the isotropic Kerr composites.
Figure 3:
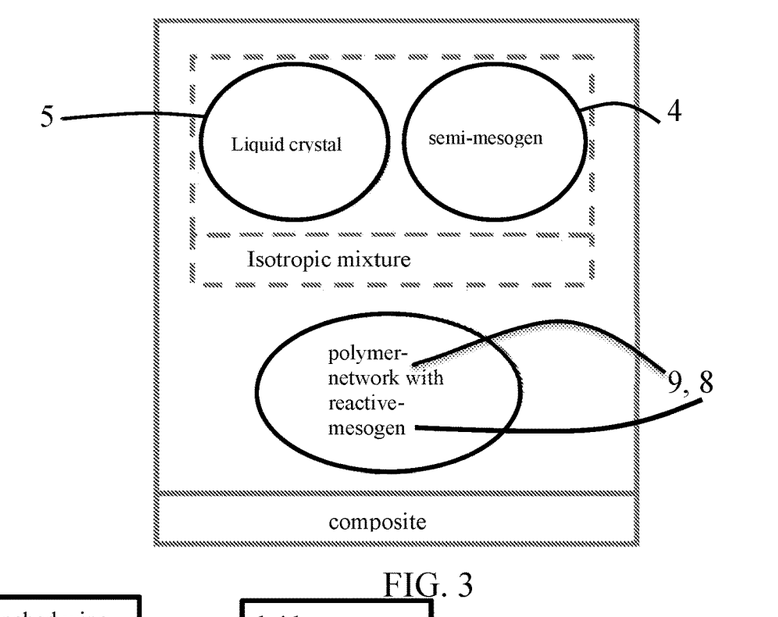

The FIG. 1 to FIG. 2 show a preferred embodiment of the electrically controllable optical element, in particular for clarifying the inventive Kerr effect of isotropic composites of a Kerr liquid K based on mixtures of rod-shaped molecules 5 and non-rod-shaped molecules 4 in anisotropic networks 9. Below it is understood by the term "liquid crystal+semi-mesogen" an isotropic mixture, by the term "isotropic mixture+reactive mesogene+aliphatic monomers+photoinitiator+" etc. a precursor mixture and by the term "precursor mixture+UV irradiation" a composite (according to the invention), as shown in FIG. 3.

The composites 4, 5 of the Kerr liquid K are characterized by a suitable combination of rod-shaped molecules 5 with large dipole moment, as well as non-rod-shaped, dipolar molecules 4, which prevent the formation of ordered states such, for example, liquid crystal phases, photocrosslinkable mono-, bi- and trifunctional molecules, in particular reactive mesogens 8, and photoinitiators 6. Photoinitiators are chemical compounds which, after absorption of (UV) light disintegrate in a photolysis reaction, thus forming reactive species that initiate a reaction; in the context of the inventive Kerr liquid K a polymerization. The reactive species are radicals or cations. Taking other ingredients, such as molecules with non-covalent interactions and fixed mesogen clusters the desired characteristics could significantly be improved.

The non-rod-shaped dipolar molecules (semi-mesogens) 4 suppress the formation of a liquid-crystalline phase at room temperature or in the working temperature range RT. Their function is to effect a clearing point depression of the liquid crystal phases of the rod-shaped molecules 5. Such a balanced clearing point depression can be achieved, for example, by voluminous wing groups, lateral substituents, by a smaller length/width ratio, due to deviations from the rod-like structure etc.

On the other hand, the molecular shape of semimesogens 4, their molecular interactions and their concentration are designed such at low levels temperatures below the working temperature range (T<RT) allow the formation of a homeotropic orientation of the mixture. One half of the molecular frameworks are therefore semi-mesogens and characterized by pronounced interactions with the mesogens of the composites and the other is non-mesogenic, whereby the deviation from the rod-like structure does not reduce the strength of the dielectric anisotropy. However, these molecules are also characterized by the highest possible dipole moment, which contributes to the strength of the Kerr effect of the composite.

By UV-irradiation (preferably with UV-power diodes) of the homeotropically oriented layers radicals are generated, they initiate a polymerization of the oriented reactive mesogens 8. The result is a wide-meshed, loose anisotropic network 9. At room temperature or in working temperature range RT, the composite of rod-shaped molecules with a large dipole moment and non-rod-shaped, dipolar molecules is isotropic again. Applying a voltage U, the molecules of the composite 4, 5 orientate themselves in the direction of the E field lines (homeotropic, i.e. perpendicular to the substrate surfaces) (see FIG. 1 left).

In one embodiment, an aligning layer 3 leading to homeotropic orientation contains photocrosslinkable or photopolymerizable groups. In this case, the anisotropic network 9 is covalently fixed to the two substrate interfaces, whereby the network is retained in its anisotropic form in particular in the isotropization of the composite 4, 5 by increasing the temperature in the working range (approximately room temperature) RT.

The polymer-based anisotropic matrix or the anisotropic network 9 serves to support the electrically induced switching state and lowers the switching voltage. It is produced by a special process in the precursor mixture 4, 5 of the active material. By generating the assistive network 9 a macroscopically perceptible phase separation is not caused, as is the case with polymer-stabilized blue phases, polymer-stabilized isotropic phases and isotropic polymer-dispersed phases.

The wide-meshed, anisotropic polymer network 9 with its orientation function (bulk alignment, orientation layer 3) produces better temperature stability, low switching voltages and an enhancement of the optical Kerr effect through self-organization.

In the extreme case, when a sufficiently high voltage U is applied and when suitable intermolecular interactions of the precisely matched composition of the composite 4, 5 occur—and only thereby—a liquid-crystalline phase is formed.

In order to obtain a lower temperature dependence by stabilization due to fixation of the order in the Kerr liquid K, the Kerr effect of isotropic composites with nanoscale clusters and nanoparticles formanisotropic molecules with large dipole moment in wide-meshed anisotropic polymer network 9 can be achieved. For this purpose, nanoscale clusters and nanoparticles of formanisotropic molecules 4, which are fixed in their ordered arrangement by covalent bonds or intermolecular interactions, are used as part of the precursor mixture 4, 5. Such nanoscale anisotropic clusters and nanoparticles extend the above approach to the Kerr effect of isotropic composite-based composites rod-shaped and non-rod-shaped molecules 4, 5 in anisotropic networks 9. The difference is that the rod-shaped molecules with large dipole moment 5 are fixed in the form of nanoscale clusters or nanoparticles in an ordered arrangement (analogous to the precursor effect of swarm just above the clearing point of nematic phase). Such clusters and nanoparticles are nanoscale small (1 nm to 200 nm, preferably 5 to 20 nm). Due to the nanoscale size they cause no scattering of the composite. Rod-shaped molecules with reactive groups (reactive mesogens) 5 can be formed by photopolymerization in droplets formed, nanoparticles or nematischen pre-ordered swarm be fixed just above the clearing point. Instead of fixation by covalent bonds, this can also be done by non-covalent intermolecular interactions (H-bonds, ionic interactions and $\pi\pi$ interactions), which also leads to more stable ordered nanoscale molecular arrangements. Such molecule clusters or spherical and aspherical nanoparticles are dispersed in the precursor mixture 4, 5. The resulting composites are isotropic, non-scattering liquids.

Orderly fixed clusters and nanoparticles based on formanisotropic molecules on the one hand cause an increase in the Kerr effect due to their high stability orientation order and minimize in particular the pronounced temperature dependence of the Kerr effect in solutions or LC materials above the clearing point.

To achieve lower temperature dependence by different temperature dependence and lower intermolecular complex formation in the Kerr liquid K, the Kerr effect of isotropic composites can be obtained on the basis of complex formation of resulting formanisotropic molecules 5 with a large dipole moment through intermolecular interactions in the wide-meshed anisotropic polymer network 9. For this purpose, the rod-shaped molecules 5 with large dipole moment are only formed by intermolecular interactions such as H-bonds, ionic interactions and $\pi\pi$ interactions (such as for example pyridine/acid, acid/acid or the like). The different temperature dependent on intermolecular interactions and pre-orientation effect are used to stabilize the effect. The ordering tendency of the rod-shaped molecules 5 is increased by non-covalent intermolecular interactions, in accordance with the above approach of the Kerr effect of isotropic composites based on mixtures of rod-shaped and non-rod-shaped molecules 4, 5. Accordingly, a voltage-induced order or reinforcement effect is caused by self-organization, which leads to high Kerr constant.

To achieve lower temperature dependence by different temperature dependence of intermolecular complex formation and to obtain a precursor effect in the Kerr liquid K, the thermal stabilization of the Kerr effect of isotropic composites can be achieved with non-formanisotropic molecules, which are formed by intermolecular interactions. In this case, the non-rod-shaped semimesogens 4 are formed only by intermolecular interactions, such as for example of H-bonds or ionic or $\pi\pi$ interactions. By the formation of the semimesogens 4 at room temperature or in the working temperature range RT an isotropic phase is generated. A temperature increase leads to the weakening of the non-covalent interactions and the complexes are (partially) degraded. In this way, their concentration is lower and so control of the order tendency is possible. The thermally induced degradation of the complexes, i.e. the reduced formation of for example H-bonds cancels the blurring of charge caused by complex formation and the fragments get a higher dipole moment. In this way, the composite obtains a higher dielectric anisotropy with increasing temperature and the Kerr effect is strengthened.

Using the active composites 4, 5 according to the invention and their use in thin layers between structured and/or flat electrodes 2, a multiplicity of applications can be realized:

Refractive and diffractive optical elements,
Electrically continuously adjustable or switchable between two states lens,
Electrically continuously adjustable and locally modifiable lens (correction lens, aspherical lenses),
locally and in the effect continuously adjustable visual aid or between two states switchable visual aid (connectable near vision section),
Electrically controllable diffraction gratings,
Polarization independent phase modulators.

Hereinafter, the construction of the electrically controllable optical element according to the present invention will be described in detail with reference to FIG. 1 and FIG. 2.

Cell Substrates 1:

The cell substrates may be glass or plastic. The substrates may be flat or concave or convex or have microlenses. The substrates 1 are held by spacers (glass or plastic fiber pieces or beads or lithographically generated polymer structures) at a uniform distance of a few µm. By optical adhesive, the two substrates 1 are fixed to each other at the end faces.

Electrodes 2:

The glass or plastic substrates 1 are provided with transparent electrodes 2. These are preferably electrodes made of ITO, metals or conductive polymers, which are produced by sputtering, evaporation, printing and the like which can be applied to the substrates 1. The electrodes 2 can be large or structured, the structuring can be done by printing, by means of masks during application of the electrodes. Alternatively, within the scope of the invention large-area electrodes are structured.

Orientation layers/Aligning layer 3:

On the ITO electrodes 2 thin layers of aligning layer 3 (20 nm to 1 µm) are applied, which cause the homeotropic orientation of the composite at low temperatures or below the working temperature range (T<RT). For this purpose, in the context of the invention, polymers such as polyimides, polyvinyl alcohol, photosensitive polymers, lecithin, and the like are used.

Optionally, the aligning layers 3 contain (photo-) cross-linkable groups which allow covalent attachment of the reactive mesogens or networks 9 formed therefrom.

Composite 4, 5:

The composite is isotropic in the working range approximately room temperature RT. Anisotropic state is determined by interfacial orientation using orientation layers achieved at low temperatures. This anisotropic intermediate state is required only for the production of the anisotropic network 9 by photopolymerization of the reactive mesogens 5. In the working temperature range RT then the isotropic state of the polar, rod-shaped and non-rod-shaped molecules 4, 5 is reached again.

Conditions during the production and operation of the electrically controllable optical element according to the invention are:
1. Isotropic initial state of the composite mixture 4, 5 between the substrates 1 at room temperature RT.
2. Homeotropic state at low temperatures before photo-polymerization (see FIG. 1, left).
3. Homeotropic state of an anisotropic network generated through photopolymerization with low temperatures (see FIG. 1 right).
4. Isotropic state with anisotropic network at room temperature RT by switching off the voltage U (see FIG. 2, left).
5. Orientation of the composite by applying an electrical voltage U. The orientation is supported by the anisotropic network 9 (see FIG. 2, right).

By combining mixtures of novel high-grade Δn materials, of components order-adjusting or -reducing and contributing to the Kerr-effect and of In-situ Generation of anisotropic polymer Networks 9 the composites according to the invention—in comparison with the use of the Kerr effect in typical liquids—have a significant increase in the voltage-induced modulation of the polarization-independent optical properties. Here, the composites are composed of different functional components:

These are on the one hand rod-shaped molecules 5 with a large dipole moment whose order tendency in the working temperature range is reduced by dipolar molecules with limited mesogenicity (semi-mesogens 4). The semi-mesogens 4 play the decisive role, since they act as a kind of disturbance to the rod-shaped high-Δn compounds and thus partially decrease their order tendency in the working temperature range and to prevent the formation of ordered states, such as LC phases. However, since they also have high dielectric anisotropy, they contribute to the Kerr effect in a cooperative manner.

Another essential component are the photo-crosslinkable reactive mesogens 8, combined with a photoinitiator 6. Below the working temperature range the starting mixtures are in a nematic LC phase, which can be homeotropically oriented by interfacial effects and/or electrical voltage. UV-irradiation in this state leads to the formation of a wide-meshed, loose, anisotropic and orienting network 9 by the photopolymerization of the reactive mesogens 8. The resulting composites are at room temperature or in the operating temperature range, however, isotropic, non-scattering and optically transparent. However, if a sufficiently high electrical voltage is applied, the polar rod-shaped molecules 5 of the isotropic liquid orient themselves in direction of the field lines perpendicular to the substrates, whereby the refractive index is changed. Here, the anisotropic network 9 supports the alignment of the rod-shaped, polar molecules 5 of the composite by a precursor effect and thus enhances the optical Kerr effect. As a result, compared with the prior art, a much stronger refractive index modulation achieved at lower switching voltages. In addition, the temperature dependence of the process is significantly reduced, allowing the technical use. The necessary tension-induced refractive index stroke or phase deviation is generated on the basis of the electro-optical Kerr effect in the composites of the invention. The isotropic, liquid composites are characterized by very short switching times.

In the configuration described above, all switching states are symmetrical to the transmission direction and thus polarization independent. Overall, the composites of the invention allow the use of the electro-optical base effect for the production of thin-film elements with lens function, since the values of the refractive index modulation significantly increased, switching times are reduced and the required switching voltage is reduced. Within the scope of the invention, novel composites of patterned diffractive lenses can be produced as base elements. The production of active Fresnel or phase zone plates alternatively requires the fabrication of annular aperiodic electrode structures and their contacting. The ring electrodes can be made in ITO. Both methods are suitable for implementing switchable lenses, Fresnel structure in the substrate or in the active material, wherein the switchable diffractive thin-film lens according to the invention can be designed and adapted for various optical applications, which will be explained in more detail below.

As stated above, switchable lenses based on the principle of electro-wetting and elastomeric membranes are little suitable due to their weight, the voluminous supply components and the limited aperture for vision aids and telescope spectacles. Even for the production of hybrid optics, these approaches are limited.

Switchable lenses based on liquid crystals do not show these disadvantages. However, the polarization dependence of oriented liquid crystals severely limits this approach. To overcome this disadvantage, additional optical components such as, for example, polarizers or multiple LC elements with opposite LC orientation (see A. Y. G., Ko, S. W., Huang, S. H., Chen, Y. Y., Lin, T. H., Opt. Express 2011, 19, 2294-2300) or counter-orienting layers (see in particular Ren, H., Lin, Y. H., Fan, Y. H., Wu, S. T. Appl. Phys. Lett. 2005, 86, 141110; Lin, Y. H.; Ren, H.; Wu, Y. H.; Zhao, Y.; Fang, J.; Ge, Z.; Wu, S. T. Opt. Express 2005, 13, 8746-8752; Wang, B.; Ye, M.; Sato, S., Opt. Commun. 2005, 250, 266-273) were used. However, the Luminous efficiency is reduced, the system structure is significantly more complex and there are additional sources of error in production.

On the other hand, isotropic LC elements based on PDLC have a strong scattering of the droplets of different orientation in the OFF initial state. Nano-PDLC systems, which are optically nearly transparent in both states, also show residual scattering. In addition, the necessary switching voltage is comparatively high and the switching times are significantly longer than those of other LC elements due to the interaction of the nanometer-sized droplets with the polymer matrix enclosing them.

Since the process of dielectric reorientation (especially in the field-free state) is generally relatively slow in LC elements, numerous approaches have been taken in recent years to achieve shorter switching times of LCDs and for other LC elements. Examples are: the optimization of the viscoelastic parameters of NLCs, the overmodulation of the system (see D. K. Yang and S.-T. Wu, Fundamentals of Liquid Crystal Devices (John Wiley, New York, 2006)), the "realignment" of an NLC in Sub µm-polymer network templates (see J. Xiang and OD Lavrentovich, Appl. Phys. Lett. 103, 051112 (2013)) or by dual-frequency LC's (DFLC) (see B. Golovin, S. V. Shiyanovskii, and O. D. Lavrentovich, Appl. Phys. Lett. 83, 3864 (2003)), surface-stabilized ferroelectric LCs (SSFLC) or chiral smectic LC's (see G. Polushin, V. B. Rogozhin, and E. I. Ryumtsev Doklady Physical Chemistry, 2015, Vol. 465, Part 2, pp. 298-300).

The Kerr effect based on the orientation of polar molecules (see, for example, Bing-Xiang Li, Volodymyr Borshch, Sergij V. Shiyanovskii, Shao-Bin Liu, Oleg D. Lavrentovich, Appl. Phys. Lett. 104, 201105 (2014)) and does not require the dielectric reorientation of the LC director of oriented liquid crystals (Frederiks effect), has switching times in the nanosecond range (1-33 ns). However, the switching voltage required in conventional Kerr fluids is several hundred volts (300 to 900V, $E=10^8$ V/m), with values of electrically induced birefringence ranging from 0.001 to 0.01. These approaches are limited by more complicated drive circuits, by hysteresis behaviors, and also by unstable switching states (Su Xu, Yan Li, Yifan Liu, Jie Sun, Hongwen Ren, Shin-Tson Wu, Micromachines 2014, 5, 300-324).

An alternative are blue LC phases, which have a complex 3D structure, but are optically isotropic in the field-free state. They are characterized by short switching times, but are unsuitable for lens applications because of the very small thermal existence areas of the phases. Polymer-reinforced blue phases (PSBP, see Su Xu, Yan Li, Yifan Liu, Jie Sun, Hongwen Ren, Shin-Tson Wu, Micromachines 2014, 5, 300-324) show higher refractive index modulation, with application-relevant areas of existence, but have relatively high switching voltages and significant scattering effects (see Y. Haseba and H. Kikuchi, Mol. Cryst. Liq. Cryst., 2007, 470, 1; Young-Cheol Yang and Deng-Ke Yang Applied Physics Letters 98, 023502, 2011) in the OFF-state.

The orientation of polar molecules in the electric field has long been known as the optical Kerr effect. The Kerr constants of conventional liquids such however, for example, nitrobenzene or carbon disulfide are orders of magnitude too low for the lens application and the switching voltage for relevant layer thicknesses is too great. Significantly higher Kerr constants, with switching times in the millisecond and sub-ms range, are found in isotropic melts of nematic liquid crystals (see F. Costache, M. Blasi Optik & Photonik Volume 6, Issue 4, pages 29-31, December 2011), this leads to polarization-free, fast-switching and efficient Kerr systems. The effect obviously has two causes; on the one hand, the rod-shaped, polar liquid crystals with an elongated 7-system cause high Kerr constants and, on the other hand, the cause is the nematic pre-orientation effect of molecular swarms above the clearing point. The resulting extremely strong temperature dependence of the effect is a major disadvantage of this approach.

The described disadvantages are overcome by the isotropic composites according to the invention. By combining isotropic mesogens and semi-mesogen mixtures in anisotropic polymer networks 9, high values of refractive index modulation become fast switching times and moderate switching voltages are achieved. The novel material concept can be used to produce electrically switchable or adjustable optical lenses and other optical elements based on the optical Kerr effect.

For this purpose, liquid-crystalline compounds with very high refractive index anosotropy were selected and, matched to this, isotropic semi-mesogens were developed and mixed with the former, so that the resulting mixtures of both components have only latent liquid-crystalline properties. In particular, these are without applying electrical voltage isotropic liquids in operating temperature range. The semi-mesogens 4 according to the invention are in structure, their combination of properties and function a new class of functional materials. The attitude of that required characteristics through suitable molecular design and efficient syntheses will be described in more detail below.

The composites of the invention require precise adjustment of the optical and dynamic characteristics as well as the intermolecular interactions of the major components of these mixtures (see FIG. 3), consisting of:

Liquid-crystalline compounds with high refractive index anisotropy,

Semi-mesogens 4 to adjust the order as well

Photopolymerizable reactive mesogens 8 to form an anisotropic network 9.

According to the invention, the Kerr mixtures contain rod-shaped liquid crystals 5 with large refractive index anisotropy. Their high order tendency and their high melting and clearing points are lowered by mixing with semi-mesogens 4 such that the mixtures are present in the working temperature range RT as isotropic liquids. In complex series of experiments, various molecular approaches to adjust this combination of properties have been tested: for example by setting suitable length/width ratios, varying the length of the rigid aromatic ring systems, the length and branching of the wing groups and by varying the polarity of the head group, generally the setting of suitable LC-phase for suppressive intermolecular interactions. The polar semi-mesogens 4 were designed so that they can also be oriented in the electric field, but suppress the liquid-crystalline properties of the mixtures. These semi-mesogens 4 only have potential LC characteristics and are isotropic liquids which have only latent liquid crystalline characteristics.

With regard to the also required optical and electro-optical characteristics of the Kerr mixtures, the semi-mesogens 4 cannot be replaced by any solvent. The orientation of the liquid crystals are defined degraded and adjusted according to the invention. Thus, the final mixtures should be in the working range as an optically isotropic liquid, but have a nematic pre-orientation tendency. At low temperatures, however, they should be liquid crystalline and can be homöotropically aligned by Aligning layer or by applying an electric field. This defined orientation order is necessary for the construction of the anisotropic network by photopolymerization at low temperatures.

The semi-mesogens 4 have to fulfill further functions, they contribute according to the invention by their molecular design also to the optical Kerr effect. Therefore, they should also have a high dielectric anisotropy, contribute to high refractive index anisotropy and support the cooperative orientation of the mixtures in the electric field. This combination of these different properties is achieved by following structural features:

(1) The degradation of the liquid-crystalline order can be achieved by secondary or tertiary branching of the alkyl-wing group and/or by lateral substituents.
(2) A high dielectric anisotropy, high Kerr constants and high refractive index anisotropies are achieved by the variation of the polar head group as well as the introduction of heterocycles in the rigid molecule fragments.

Figure 4:
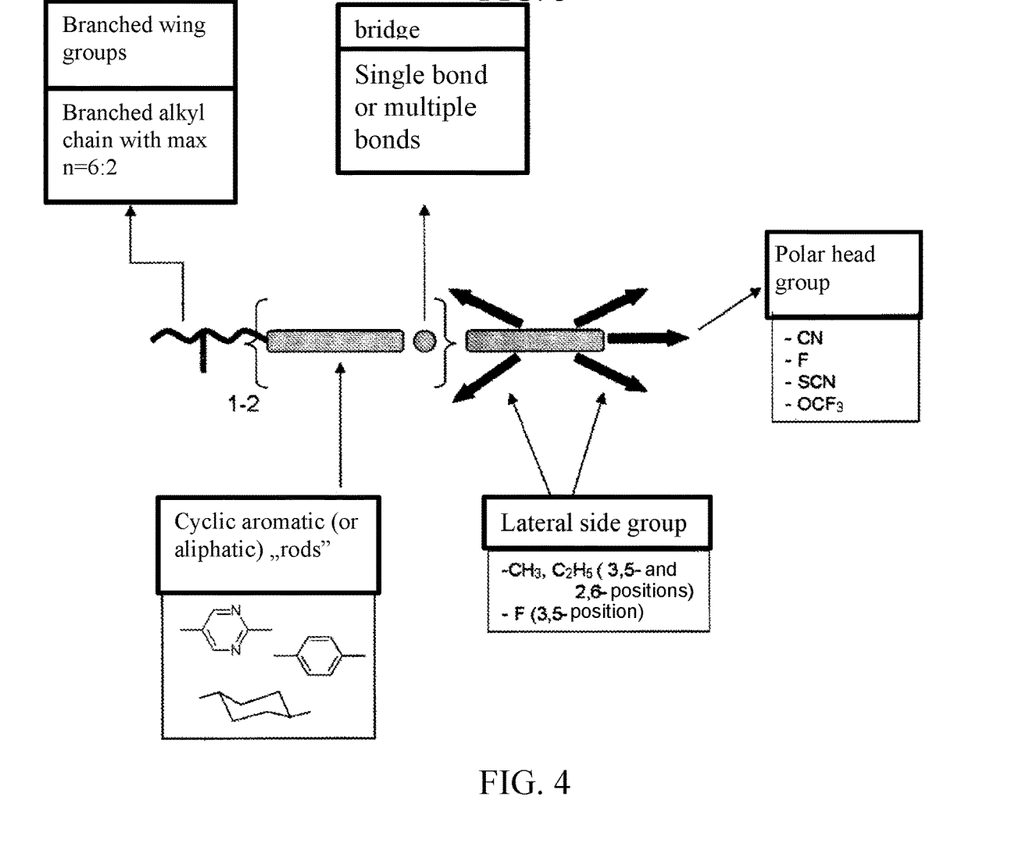
FIG. 4 shows the architecture of a preferred embodiment of the semi-mesogens and FIG. 5*a*, 5*b* shows an embodiment of a multi-dimensional, anisotropic network.

The basic architecture of the semi-mesogens 4 is shown in FIG. 4.

The described functionality of the isotropic semi-mesogens 4 can be achieved on the basis of suitably substituted biphenyls. In particular, branched wing groups increase the width of a molecule drastically and lead to a significant lowering of the transition temperatures. By the changed length/width ratio the formation of nematic phases or the existence of such a phase can be greatly reduced. This is achieved by the incorporation of, for example, methyl and ethyl groups as branching of the aliphatic wing group, the position of the branch on the wing group being very important.

These structural characteristics are given below a) for a wing group with secondary branching, R=CN

$R_1 = \text{---}CH_3, \text{---}C_2H_5,$
$m = n = 2\text{-}4$ and b) for a wing group with tertiary branching, R=CN

$R_1 = \text{---}CH_3, \text{---}C_2H_5,$
$m = n = 2\text{-}4$

The target isotropic semi-mesogens 4 with high dielectric and optical anisotropy, i.e. to synthesize high $\Delta\varepsilon$ and $\Delta\eta$ values, for example, can be promoted by a polar head group. Particularly suitable groups which on the one hand give a high contribution to the electrically inducible birefringence and on the other hand contribute to a high dielectric anisotropy are the following substituents in the para position of the biphenyl structure, namely substitution of the mesogenic entity with polar head groups, advantageous:

$R_1 = \text{---}CN, \text{---}NCS, \text{-Hal(F, Br, Cl)}$

Furthermore, the permanent dipole moment and thus the dielectric anisotropy $\Delta\varepsilon$ of the semi-mesogens 4 can be increased by exchanging phenyl rings for heteroaromatic cores. While the molecular geometry changes only slightly by heteroaromatic cores, according to A. Boller, M. Cereghetti, H. Scherrer, Z. Naturforsch., Part B, 33, 433 (1978), a strong influence on the dielectric characteristics is expected, whereby the position of the heteroatoms or even of the heteroaromatic in comparison to the head group is to be chosen such the dipole moments behave additively. In addition to the increase in the dielectric anisotropy, an increase in the polarizability anisotropy and thus a higher birefringence can be expected. This is illustrated in particular for semi-mesogen 4 with pyrimidine ring and variation of the head group below.

$R_1 = \text{---}CN, \text{---}NCS, \text{-Hal(F, Br, Cl)}$

The dielectric anisotropy can be further increased by polar groups on the rigid rings. Lateral substituents can simultaneously counteract a partial compensation of the dipole moments by dimer formation.

In particular, the introduction of two fluorine atoms in the 3,5-position causes an increase in the dielectric anisotropy by 8.5 units (see P. Kirsch, A. Hahn, Eur. J. of Org. Chem. (2005), (14), 3095-3100. In the case of lateral 3,5-substitution, the partial electric charge is maintained along the molecular longitudinal axis (i.e., a dipole moment parallel to the longitudinal axis), resulting in a positive dielectric anisotropy. At the same time, the lateral substituents cause a lowering of the transition temperatures. In particular, the increase in dielectric anisotropy due to the introduction of polar substituents is shown below.

1: $\Delta\varepsilon = 13.0$

2: $\Delta\varepsilon = 21.5$

According to the invention, the field-induced alignment of the isotropic mixture is supported by an anisotropic polymer network 9. The orienting memory effect of network 9 in combination with the nematic precursor effect of the latently liquid-crystalline composites enhances the optical Kerr effect.

Figure 5A:
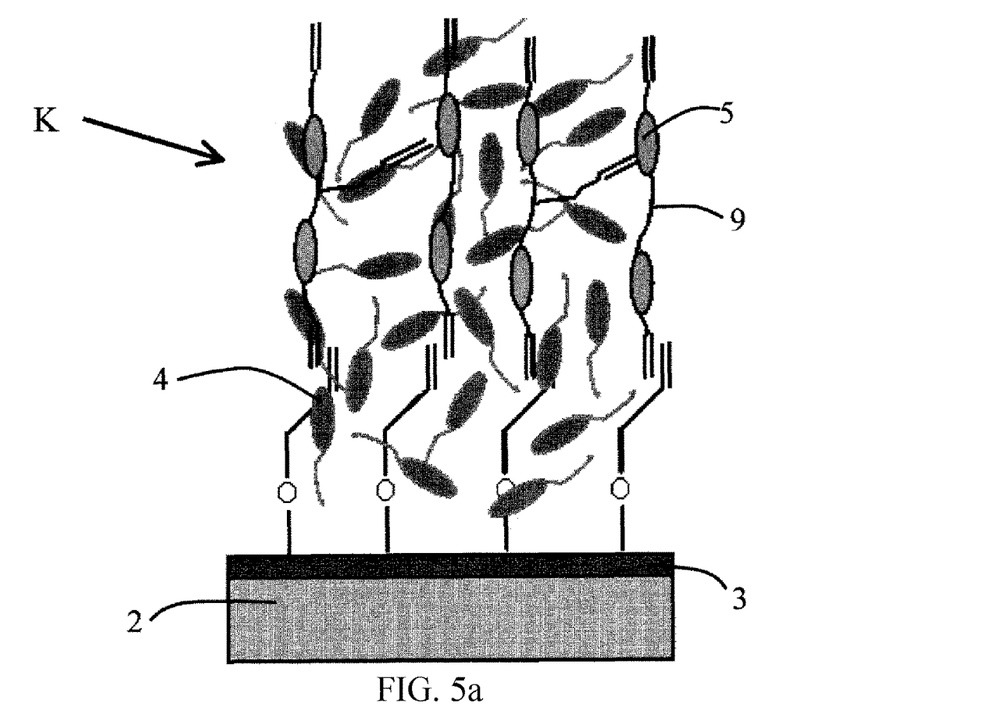
Figure 5B:
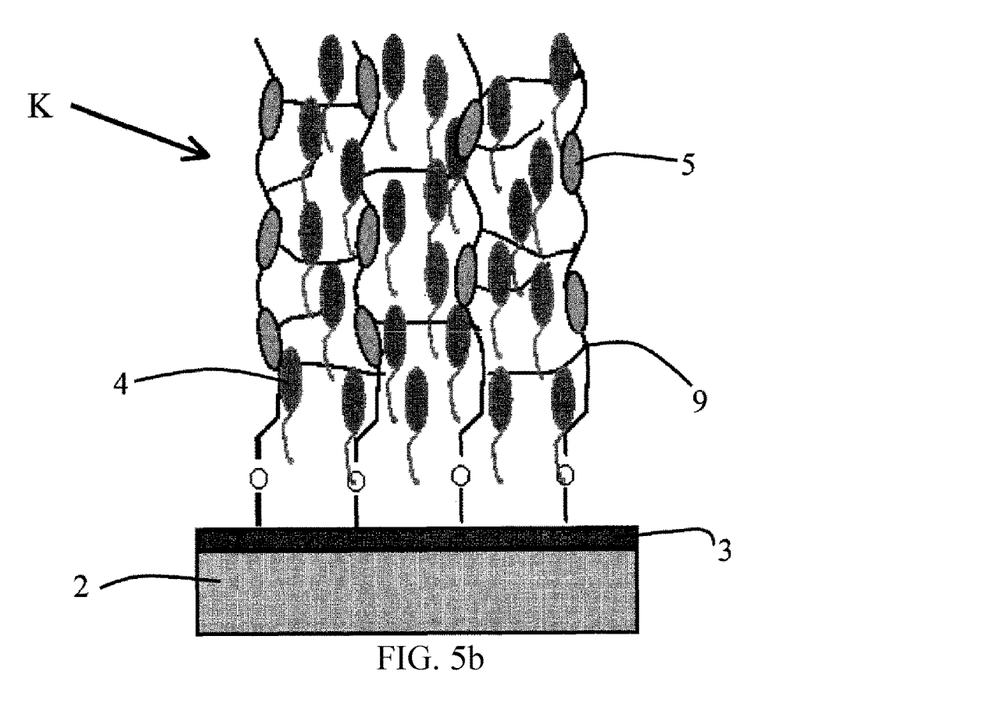

Another important task of the network 9 is the significantly reduce the temperature dependence of the Kerr effect. For the construction of the network 9, in particular aromatic reactive mesogens 8 and aliphatic monomers are introduced into the isotropic mixture consisting of mesogens and semi-mesogens 4. These are then photopolymerized in the homeotropically ordered state of the composites at low temperatures and form a wide-meshed anisotropic network 9. The incorporation of the reactive mesogens 8 requires a vote of intermolecular interactions in the starting mixtures as well as in the final composites after construction of the network structure. In order to additionally achieve a high stability of the network 9, the network 9 is through functionalization of aligning layers 3 covalently linked to the substrates. FIG. 5 shows the generation of a multi-dimensional, anisotropic network, namely:
a) Isotropic mixture with reactive mesogens 8 in homeotropically oriented mixture (pre-composite) (see FIG. 5*a*) and
b) Covalent linkage of network 9 and aligning layer 3 with network stabilized molecules (see FIG. 5*b*).

The covalent anchoring of the network 9 at the interfaces of the aligning layers 3 leads to a significant improvement of the electro-optical switching behavior and long-term stability. For this purpose, the aligning material is functionalized with temperature-stable, reactive groups (for example OH groups). The modified material is to be applied to the substrate and the functional groups modified so that they can react with bifunctional reactive mesogens 8. The by radical photopolymerization triggered network formation involves the interconnection with the two functionalized aligning layers 3, so that the anisotropic network 9 traverses the cell permanently and interface stable. The necessary concentration of the binding sites at the interfaces must be adjusted in a suitable manner.

In addition improving the characteristics of the composite by the network formation, based on aliphatic or aromatic reactive mesogens 8, also possible segregation phenomena are suppressed.

The Kerr composites according to the invention correspond, for example for the application fields of lenses, in particular for visual aids and telescope spectacles, to the following requirement profile:
high Kerr constant
high dielectric anisotropy
isotropic and fluid in the working temperature range through the semi-mesogens 4
high electrically inducible refractive index modulation by rod-shaped molecules 5 and polar semi-mesogens 4
good homogeneity (mixture of the substances, low tendency to phase separation) over—the entire working temperature range
low switching times due to low rotational viscosity
low absorption in the visible spectral range
high (photo) chemical stability.

Furthermore, polarization independence and fast switching times of the approach are significant advantages compared to liquid crystal based approaches. The composites according to the invention combine the advantages of liquid-crystalline systems (large Kerr constants of rod-shaped polar molecules and high molecular weight ordering tendency) and on the other hand of isotropic liquids with low rotational viscosity and very short switching times and so they combine the advantages of calamitic liquid crystals with those of isotropic liquids.

For vision aids, the lens of the invention has a polarization-free, electrically adjustable near field at moderate switching times and according to the application uncritical switching voltages of <42V. The diameter of the lens provides an adequate field of view and the refractive power of the switchable lens is in the single-digit diopter range. The optical function is essentially little dependent on the wavelength of light and the diffraction efficiency is quite high, so that "ghost images" are avoided. Furthermore, the lens according to the invention can be combined with typical spectacle lenses and has a low weight and volume for the control of the element, so that it can be integrated together with a normal lens or in a spectacle frame.

In the context of the invention, the use of vision aids can be extended to a tunable, individually adjustable visual aid.

By using pixelated electrode grids, similar to a transmissive LC display, the optical properties can be set individually for very small areas. This makes it possible to produce diffractive lenses having, for example, a direction-dependent refractive power, as they are used to correct astigmatism. The setting of the lens then can be individually adapted and stored, as is described for the binocular electronic spectacles of EP 1 463 970 B1.

In the context of the invention, the use of the lens according to the invention in a switchable magnification system for telescope spectacles is possible. At the magnification system, there are some similar requirements as in the field of vision aids. However, the refractive power of the eyepiece lens and objective lens must be much stronger. At the necessary aperture, however, the requirements are significantly lower, in particular for the eyepiece lens. For the magnification system, a magnification factor of 2.5 is sufficient. As with the single element, the system can be realized with as low a weight as possible in order to achieve the desired high wearing comfort. This is clearly different between solutions according to the invention to currently available telescope glasses. Another significant advantage is, of course, that in the off state, the entire field of view is available; to be integrated tax and supply elements these do not restrict this.

The lens according to the invention fulfills the technical requirements for:
a) Polarization-free, electrically adjustable near-vision field for visual aids, in particular visual aid with connectable near vision section,
b) Tunable, individually adjustable visual aids (visual aids with pixelwise activation using μm-structured electrodes, similar to a transmissive active-matrix-display) and
c) Switchable magnification system for telescope-spectacles or multifunctional glasses,
as can be seen from the following table.

|  | a) | b) | c) |
| --- | --- | --- | --- |
| Switching time | <10 ms | <10 ms | <10 ms |
| Switching voltage | <42 V | <42 V | <42 V |
| Diameter | >25 mm | >25 mm | >4 mm (eyepiece) >20 mm (lens) |
| Diffraction efficiencies | >80% | >80% | >80% |
| Refractive power or Focal lenght | >4 dpt | >8 dpt (aspherical) | <(−)30 mm (eyepiece) <75 mm (lens) |

Other requirements that are met are high transparency, reproducibility, high reliability and high fill factor to avoid "ghosting" as well as a polarization-independent mode of operation. In addition, the individual elements are optically neutral in the off-state.

The invention is not limited to the illustrated and described embodiments, but also includes all equivalent embodiments according to the invention.

For example, a synthesis based on laterally substituted biphenyls for the preparation of semi-mesogens and synthesis of a catalyst for the final coupling reaction for the preparation of the substituted biphenyls can be carried out; for the preparation of 5 semi-mesogens, a synthesis and characterization of 5 substituted arylboronic acids are carried out; to formulate stepped lenses into various materials, a surface characterization of available step lenses may be accomplished by profilometry including the production of PDMS castings (manufacture of surface mesh and microlens arrays, including epoxies-mixture for surface grid molding, in Sylgard 184 (Silicon-Elastomer-Kit) and production of replica with NOA65 (Optical Adhesive: Viscosity 1200 (cps), refractive index nd1.52), in particular blazed grids (method for molding of surface grids with sawtooth profile to produce linear surface gratings, which serve as model structures for corresponding Fresnel zone plates); the impression of the surface grids with the help of a master (commercial diffraction grid), this was molded as a negative copy in POMS and with this "stamp" can then be prepared via another molding step with NOA positive replicas, that inter alia are useful for the construction of appropriate switchable optical elements; using appropriate mechanisms of Suzuki-Miyaura aryl-aryl coupling (synthesis of biphenyls or biphenyl derivatives by formation of a C—C bond) or analogous reactions and application of chromatographic purification of intermediate compounds (especially multi-step synthesis with intermediate cleaning operations). The fields of application of the electrically controllable optical element according to the invention extend into many areas of technology, in particular:

Measuring Technology
Analysis of samples with Kerr cell in the measuring head
Wafer inspection systems
Polarizer in microscopes or endoscopes
Measurement of electric field strength
Manufacturing Engineering
Microlithographic projection exposure system for IC 's or LCD' s
Light modulator for the exposure of printing plates
Polarization direction rotating element when recording to CD or DVD Information transmission technology
Fast light switch with Kerr cell and with or without downstream polarization filter for digitizing signals up to 100 GHz (optical signal)
Medical
optical modulator in an MRT-system (magnetic resonance tomography system)
Polarizer in microscopes or endoscopes Furthermore, the invention has hitherto not been limited to the combination of features defined in specific claims, but may also be defined by any other combination of certain features of all the individual features disclosed overall. This means that in principle nearly every single feature of any claim can be omitted or replaced by at least one individual feature disclosed elsewhere in the application.

LIST OF REFERENCE NUMBERS

1 Substrates
2 Conductive layer (conductive ITO electrode)
3 Orientation layer (aligning layer)
4 Non-rod-shaped molecules (active composite, semi-mesogen, precursor mixture)
5 rod-shaped molecules (active composite, precursor mixture)
6 Photoinitiators
7 Aliphatic monomers
8 Reactive mesogens
9 Anisotropic network (polymer network)
10 crosslinked mesogens
K Kerr fluid
RT working temperature range
U voltage

What is claimed is:

1. An electrically controllable optical element comprising a thin-film cell having:

two spaced-apart substrates, each of said two spaced-apart substrates having an inner surface to which a planar and/or structured conductive layer is applied; and
a Kerr-effect composite disposed between the conductive layers applied to the two spaced-apart substrates;
wherein the Kerr-effect composite comprises
a mixture of rod-shaped molecules and non-rod-shaped semi-mesogen molecules as active components, and
an anisotropic polymer network formed of polymerized reactive mesogens,
wherein the non-rod-shaped semi-mesogen molecules in the Kerr-effect composite prevent the formation of ordered states including liquid crystal phases in a range of temperatures at which the thin-film cell is operable,
wherein, without an electric field, a state of the active components of the Kerr-effect composite is isotropic in the range of temperatures at which the thin-film cell is operable, and
wherein, upon application of a voltage or adjustment of an applied voltage in the range of temperatures at which the thin-film cell is operable, the active components of the Kerr-effect composite change orientation and thereby produce voltage-induced changes to optical properties of the optical element.

2. The electrically controllable optical element according to claim 1, wherein the two spaced-apart substrates of the thin-film cell are glass or polymer substrates, wherein the inner surface of each substrate comprises a conductive ITO (indium tin oxide) electrode as the conductive layer, wherein an orientation layer is applied on the conductive layer, and wherein a pre-stamping of the anisotropic polymer network takes place by means of:

cooling an admixture of photoinitiators, aliphatic monomers and the reactive mesogens present in a precursor of the Kerr-effect composite down to a liquid crystal phase or aligning the rod-shaped molecules by applying a voltage; and
irradiating the precursor of the Kerr-effect composite with UV radiation to initiate polymerization of the reactive mesogens.

3. The electrically controllable optical element according to claim 2, wherein the orientation layer contains photocrosslinkable or photopolymerizable groups that promote a homeotropic orientation of the reactive mesogens, and wherein the anisotropic polymer network is covalently fixed to the orientation layers applied to the conductive layers applied to the two spaced-apart substrates such that the anisotropic polymer network is maintained even when isotropization of the Kerr-effect composite after the cooling has ended and the temperature increases to approximately room temperature.

4. The electrically controllable optical element according to claim 1, wherein the rod-shaped molecules have a large dipole moment and are fixed in a form of nanoscale clusters or nanoparticles of formanisotropic molecules in the anisotropic polymer network, and wherein fixation of the formanisotropic molecules in the anisotropic polymer network takes place by non-covalent intermolecular interactions.

5. The electrically controllable optical element according to claim 4, wherein the non-covalent intermolecular interactions of the formanisotropic molecules are formed based on hydrogen bonds, ionic interactions and $\pi\pi$-interactions of pyridine/acid or acid/acid.

6. The electrically controllable optical element according to claim 1, wherein the non-rod-shaped semi-mesogens are formed as complexes in the Kerr-effect composite by intermolecular non-covalent interactions, and wherein a tempera- ture increase leads to weakening of the non-covalent interactions such that the complexes of the non-rod shaped semi-mesogens are partially degraded.

7. The electrically controllable optical element according to claim 6, wherein to synthesize isotropic non-rod shaped semi-mesogens having a high dielectric and optical anisotropy, substituents, $R_1$, are inserted as a polar head group in a para position of a biphenyl structure according to the formula:

where $R_1$ is selected from the group consisting of —CN, —NCS, —Br and —Cl.

8. The electrically controllable optical element according to claim 6, wherein a permanent dipole moment and dielectric anisotropy of the non-rod shaped semi-mesogens are increased by an exchange of phenyl rings for heteroaromatic cores in non-rod shaped semi-mesogens according to the formula:

where $R_1$ is selected from the group consisting of —CN, —NCS, —Br and —Cl.

9. A method for producing an electrically controllable optical element according to claim 1, wherein:

a) providing a precursor to the Kerr-effect composite comprising a mixture of rod-shaped and non-rod-shaped semi-mesogen molecules as active components, reactive mesogens, photoinitiators and aliphatic monomers;

b) disposing the precursor to the Kerr-effect composite between the conductive layers applied to the inner surfaces of the two spaced-apart substrates of the thin-film cell;

c) cooling the precursor to the Kerr-effect composite to a temperature lower than room temperature at which a liquid crystal phase of the reactive mesogens forms having a homeotropic orientation, d) generating radicals by UV irradiation of the photoinitiators, effecting polymerization of the homeotropically oriented reactive mesogens such that an anisotropic polymer network, which comprises the reactive mesogens crosslinked with the aliphatic monomers, results in the Kerr-effect composite and such that, without a voltage at room temperature, an isotropic state of the active components is formed, and such that, when a voltage is applied or an applied voltage is adjusted, the active components of the composite change orientation and thereby produce voltage-induced changes to optical properties of the optical element.

10. The method according to claim 9, wherein an orientation layer is present to form the layers having the homeotropic orientation, and said orientation layer contains photocrosslinkable or photopolymerizable groups for binding the polymeric network onto the orientation layer during the polymerization of the homeotropically oriented reactive mesogens.

* * * * *